United States Patent [19]

Sarnoff et al.

[11] Patent Number: 4,817,812

[45] Date of Patent: Apr. 4, 1989

[54] HOLDING FRAME FOR AN OVEN PAN

[75] Inventors: Norton Sarnoff; Carl R. Fletcher, both of Wheeling, Ill.

[73] Assignee: Ensar Corporation, Wheeling, Ill.

[21] Appl. No.: 603,781

[22] Filed: Apr. 25, 1984

[51] Int. Cl.⁴ .................. B65D 90/00; B65D 90/12
[52] U.S. Cl. .................. 220/85 H; 220/19; 220/401; 220/405; 220/94 A; 229/3.5 MF
[58] Field of Search .......... 220/85 H, 19, 401, 405, 220/94 A; 229/1.5 H, 3.5 MF; 206/5.3

[56] References Cited

U.S. PATENT DOCUMENTS

| | | | |
|---|---|---|---|
| 240,891 | 5/1881 | Cook | 220/85 H |
| 391,524 | 10/1888 | Farrell | 220/85 H |
| 639,150 | 12/1899 | Cooney | 220/19 |
| 995,486 | 6/1911 | Schaumberg | 220/19 |
| 1,257,119 | 2/1918 | Reynolds | 220/94 A |
| 1,385,841 | 7/1921 | Melish | 220/19 |
| 2,710,112 | 6/1955 | Thompson | 220/405 |
| 2,736,453 | 2/1956 | Russell | 206/513 |
| 3,155,304 | 11/1964 | Boerend | 220/405 |
| 3,194,429 | 7/1965 | Bouet | 220/85 H |
| 3,779,231 | 11/1973 | Anderson | 229/1.5 H |

Primary Examiner—George E. Lowrance
Attorney, Agent, or Firm—Lee & Smith

[57] ABSTRACT

An aluminum foil oven pan having a holding frame therefor is disclosed. The holding frame comprises wire and has generally co-planar pan support members extending beneath the bottom wall of the pan. The pan support members terminate in upwardly extending lateral portions for restraining the side wall of the pan. At least two of the lateral restraining portions are provided with handle means whereby a retained pan may be easily lifted with the holding frame so that the user need not touch the pan during cooking procedures and risk buckling the pan and spilling the food contents therefrom.

3 Claims, 1 Drawing Sheet

U.S. Patent   Apr. 4, 1989   4,817,812
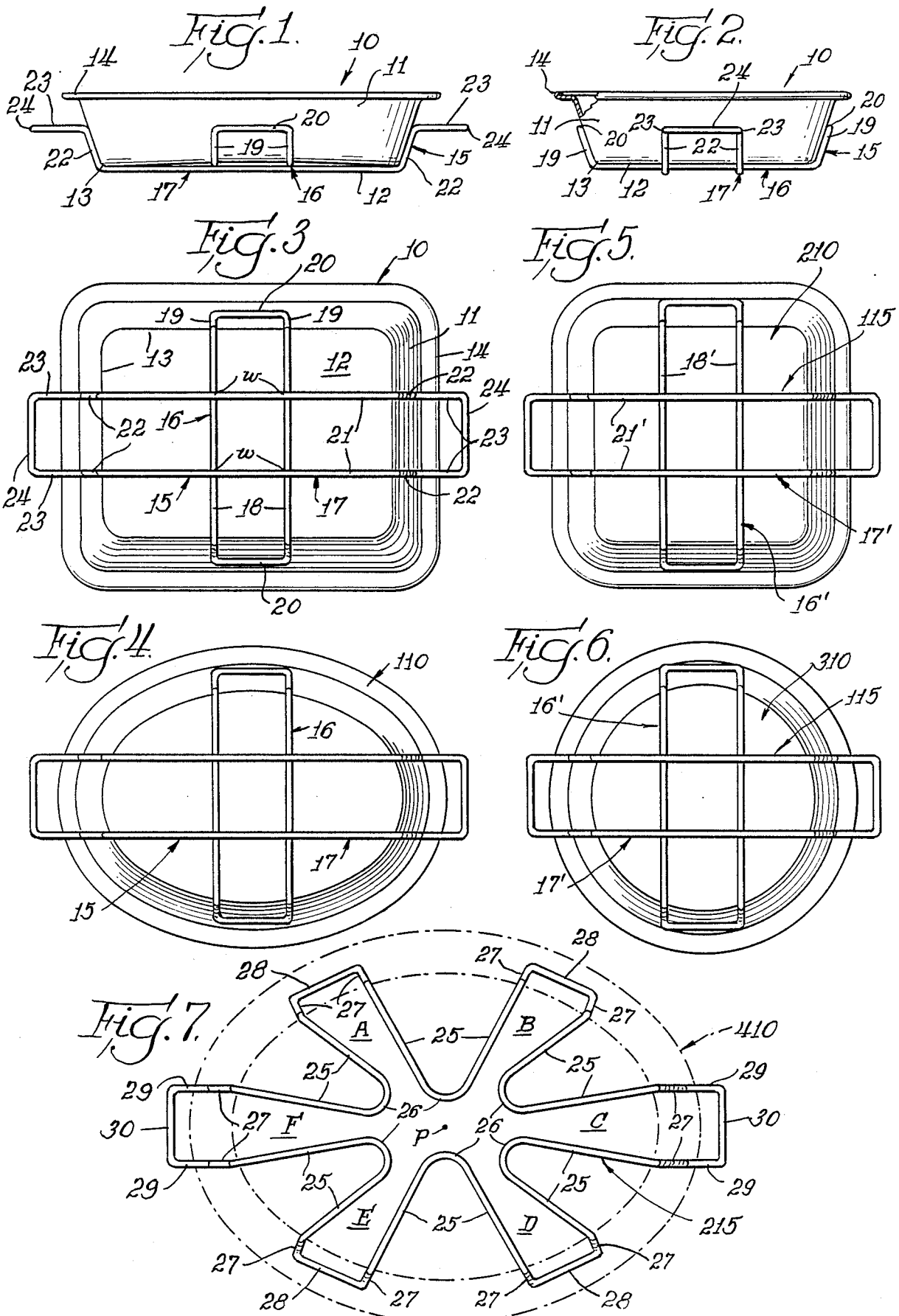

4,817,812

HOLDING FRAME FOR AN OVEN PAN

BACKGROUND AND SUMMARY OF THE INVENTION

The invention relates to a holding frame for an oven pan, particularly an aluminum foil pan.

Aluminum foil pans are widely used for cooking since they are very efficient in quickly distributing heat and are also inexpensive, thus making them disposable. A wide variety of shapes and sizes of aluminum pans have been developed for use with food items baked in an oven. Generally, such pans have an upper curled-over lip which adds a degree of rigidity and strength to the pan. Also, stamped crease lines are provided in both the bottom wall and side wall of the pan for additional reinforcement. However, due to the relatively thin and flimsy nature of the aluminum gauges commonly used, such reinforcement still fails to prevent the pan from buckling or twisting as the user carries the filled pan to or from the oven.

A significant buckling problem is found with pans that are intended for use in baking heavier items, such as turkeys, hams, roasts, etc. This problem is particularly acute when the baking process had ended and the user attempts to extract the pan from the oven when it is very hot. If there are liquids in the pan, such as cooking juices, gravy and the like, the user must take great care to prevent spillage, as well as avoiding burning the hands. Often times, two people must attempt to grasp opposite ends of an aluminum pan and hold it level during transport from the oven.

Numerous holders and racks for conventional cooking receptacles have been used. They are, however, not directed toward use with the disposable type metal foil pans. Other holding frames require cooperative engagement between the frame and a boiler or roaster of a very rigid and thick design.

Accordingly, it is a primary object of the invention to provide a holding frame for a metal foil oven pan.

It is an allied goal of the invention to provide a holding frame which can be used repeatedly with subsequent metal foil pans.

It is an important goal of the invention to provide a holding frame which is completely separable from a metal foil oven pan.

It is another objection of the invention to provide a holding frame for a metal foil oven pan in which the oven pan is supported along its bottom wall and constrained laterally along its side wall.

It is a concomitant object of the invention to provide a holding frame for aluminum oven pans in which the user can individually place the frame and pan into the oven, and later remove them from the oven, without the aid of additional assistance.

It is further a goal of the invention to provide a holding frame for an oven pan in which the user can maneuver the pan without ever contacting any portion of the pan.

It is yet another object of the invention to provide a metal wire holding frame that can be provided in a variety of configurations for the accommodation of differently sized aluminum baking pans.

The invention may be summarized as comprising a metal foil oven pan of the type having a generally flat bottom wall and a peripheral continuous sidewall, in combination with a wire holding frame having coplanar pan support members extending below the bottom wall of the pan. The pan supports terminate at the peripheral edge of the pan bottom in upwardly extending lateral sidewall retaining portions. The lateral retaining portions being provided at about the same vertical angle as the sidewall. At least one pair of lateral retainers at opposing sides of the pan terminate in handle means for lifting the pan and frame as a unit.

BRIEF DESCRIPTION OF THE DRAWINGS

The invention is described in greater detail in the following description of the preferred embodiment, taken in conjunction with the drawings, in which:

FIG. 1 is a side view of a rectangular aluminum oven pan retained in the metal wire holding frame in accordance with the invention;

FIG. 2 is an end view of the combination shown in FIG. 1;

FIG. 3 is a bottom view of the combination shown in FIG. 1;

FIG. 4 is a bottom view of an oval-shaped aluminum oven pan retained in the metal wire holding frame shown in FIGS. 1-3;

FIG. 5 is a bottom view of a square-shaped aluminum oven pan retained by a metal wire holding frame in an alternate embodiment of the invention;

FIG. 6 is a bottom view of a circular oven pan being retained by the holding frame shown in FIG. 5; and, FIG. 7 is a bottom view of a large-sized oval oven pan retained by a one-piece metal wire holding frame in another alternate embodiment of the invention.

DESCRIPTION OF THE PREFERRED EMBODIMENT

With reference to FIGS. 1-3, it will be seen that a conventional rectangular aluminum oven pan 10 is shown. Pan 10 includes a continuous sidewall 11 formed integrally with a generally flat bottom wall 12 along the peripheral edge 13 of the bottom. For extra rigidity in handling the pan, a rolled-over lip 14 extends around the upper edge of the sidewall 11, as best seen in FIG. 2. Pan 10 comprises a relatively thin gauged stamped sheet of aluminum which allows it to very quickly and evenly distribute heat, while at the same time being very inexpensive and thus disposable.

Pan 10 is provided with, in combination, a wire frame 15 which ably retains the pan for transport into and out of an oven. In this preferred embodiment of the invention, frame 15 is a two-sectioned structure having a first section 16 fixedly connected to a transverse second section 17. Section 16 has parallel spaced-apart portions 18 which terminate at their opposite ends in upwardly extending end portions 19. Portions 20 connect the ends of upwardly bent end portions 19 and are arranged generally transverse to portions 18. The upwardly bent end portions 19 and connecting portions 20 form lateral retaining means for the sidewall 11 of the pan. As best viewed in FIG. 2, portions 19 extend upwardly along sidewall 11 for greater than one-half of its height and are bent at substantially the same angle that sidewall 11 extends from bottom 12 in order to provide flush abutting contact with and lateral support for the pan sidewall.

Second section 17 of frame 15 is arranged to centrally cross section 16 at generally right angles thereto. In like manner, section 17 includes two parallel spaced apart wire portions 21 which terminate at their opposite ends in upwardly bent portions 22. The bent portions 22 slope upwardly again generally at the same angle as the sidewall 11 but further include rebent portions 23 which project outwardly of frame 15 in a substantially horizontal plane as shown in FIG. 1. The ends of the horizontal portion 23 are integrally connected by transverse portion 24 and provide opposite handle means for the frame. Welds w fixedly connect the parallel spaced apart wire sections 18 and 21 which are support members for the pan bottom 12. Due to the flexible and deformable nature of aluminum foil, when sufficient food is placed into pan 10, the bottom 12 might deflect downwardly if one were to attempt to carry the pan in the conventional manner. Frame 15 avoids this by supportively retaining bottom 12 across the portions 18 and 21, as shown in FIGS. 1 and 2.

Thus, frame 15 offers horizontal constraint by means of the upwardly bent portions of the frame and vertical support by means of the support portions 18 and 21. This arrangement facilitates the easy maneuvering of pan 10 when it is loaded with food. One peson simply grasps transverse portions 24, or handle means, and lifts the pan to the desired location.

With reference to FIG. 4, it will be understood that an ovalshaped pan 110 may also be used with frame 15. Section 16 extends across the short axis of the oval-shape while section 17 resides along the long axis thereof.

With reference next made to FIG. 5, it will be appreciated that frame 115 is provided for a square-shaped aluminum foil pan 210. In this alternate embodiment of the invention, frame 115 includes equal length sections 16' and 17' having, respectively, parallel spaced apart wire portions 18' and 21' also of equal length. Section 17' is provided with handle means projecting outwardly from its upwardly bent portions in substantially the same manner as frame 15.

In FIG. 6, a circular-shaped aluminum foil pan 310 is provided in combination with frame 115 as described in FIG. 5. The diameter of the pan bottom is substantially of the same dimension as the length and width of the square-pan 210, whereby sections 16' and 17' extend generally along two transverse diameters of the circular shape.

It will be understood, with respect to frames 15 and 115 shown in FIGS. 1–6, that a modification of sections 16, 16' and 17, 17' may be provided to accommodate various sizes of pans. For pans of different sidewall heights, the upwardly bent portions at the ends of the wire portions 18, 21 and 18', 21' may be shortened or lengthened to thereby offer lateral restraint along a major portion of the height of a sidewall. Additionally, the length of the wire portions 18, 18', 21 and 21' may be varied to accommodate an infinite variety of pan bottom sizes.

With reference now made to FIG. 7, another alternate embodiment for the holding frame of the invention is shown and comprises a single wire loop frame 215. Frame 215 is formed to provide a holding frame for an oval pan 410, as shown, In this regard, frame 215 comprises individual loop segments A, B, C, D, E and F. Each segment includes two straight wire portions 25 which are integrally connected by curved connecting portions 26. In this embodiment, the straight portions 25 all extend in radial direction passing through the center point P of oval pan 410. However, the continuous wire loop frame 25 may be provided in a variety of configuratios and is not intended to be limited to the embodiment disclosed. At the peripheral edge of the pan bottom, the straight portions 25 terminate thereat in upwardly bent portions 27, in similar manner to those as described for frames 15 and 115. The upwardly bent portions 27 of loop segments A, B, E and D are connected by transverse connecting portions 28. Loop segments C and F are arranged generally along the long axis of the oval. Segments C and F are provided with handle means wherein their upwardly bent portions 27 are re-bent to form outwardly projecting portions 29 which are integrally connected by transverse handle portions 30. Straight and curved wire portions 25 and 26 of loop segments A–F are arranged in co-planar relationship and provide support for the pan bottom as would be clear. The upwardly bent portions 27 provide lateral restraints for the sidewall of pan 410. Frame 215 is very useful with large-sized oval pans, such as those having a long axis length of 18 inches or more, and a shorter axis length of 12 inches or more. Such type pans are used for baking large items such as turkeys.

Frame 215 is not limited to use with oval-shaped pans and, for example, may be shaped for accommodating circular pans whereby the individual loop portions A–F would all have substantially the same dimensions. A continuous single wire holding frame is also envisioned for square and rectangular pans wherein four loop segments are provided arranged at 90° therebetween.

Within the scope of the invention it is further to be understood that frames 15 and 115 may be provided with pan support sections which do not all cross. For example, a plurality of sections 16 can be provided in parallel relationship with each one crossing section 17 at a different location. Also, with reference to FIG. 6, frame 115 can be provided with more than two sections that radially extend from the center of pan 310.

It will be understood that the holding frame of the invention is not limited to use with flat bottom pans and, while the preferred embodiment has two opposing handle means, handle means can be provided at more than just two upwardly bent portions of the frame.

Accordingly, a metal foil oven pan with a holding frame has been provided which can be re-used with a succession of oven pans allowing the predecessors to be discarded after cooking. The pans are securley supported in the vertical direction and are laterally restrained to afford a very efficient carrying means for the pans. The invention permits one person to easily carry a hot pan from the oven without the need of grasping the hot pan itself and run the risk of deforming the pan and spilling the food contents therefrom.

While particular embodiments for the invention have been disclosed, it is understood that a broad range of equivalent configurations fall within the scope of the invention and the claims appended hereto.

What is claimed is:

1. In combination with a metal foil oven pan of the type having a continuous side wall extending around the periphery of a substantially planar bottom wall thereof, the improvement comprising a one-piece wire holding frame having segments forming support members capable of extending below and supportingly engaging the bottom wall of the pan, the support members generally radiating from the center of the pan bottom wall, said support members terminating at the periphery of the bottom wall in upwardly extending lateral restraining portions adapted to horizontally restrain the pan side wall, said upwardly extending portions extending to a height less than the height of the oven pan side wall, at least two lateral restraining portions arranged at opposite sides of the pan and being formed with at least one outwardly disposed section of wire forming a handle for the holding frame, whereby the oven pan is capable of being vertically supported by the support members and horizontally restrained by the lateral restraining portions and said frame and pan are adapted to be jointly lifted into and out of an oven as a unit.

2. The improvement as claimed in claim 1 wherein the lateral restraining portions extend upwardly for a major portion of the height of the side wall.

3. The improvement as in claim 1 wherein the metal foil oven pan comprises aluminum.

* * * * *